June 21, 1966   J. F. PETERSEN   3,256,949
STEERING AND DRIVE CONTROL MECHANISM FOR VEHICLES
Filed Feb. 27, 1964

John F. Petersen
INVENTOR.

BY *Owen D. Olson*
Agent

United States Patent Office 3,256,949
Patented June 21, 1966

3,256,949
STEERING AND DRIVE CONTROL MECHANISM
FOR VEHICLES
John F. Petersen, Beaverton, Oreg., assignor to Real
Estate Securities, Inc., Portland, Oreg., a corporation
of Oregon
Filed Feb. 27, 1964, Ser. No. 347,921
2 Claims. (Cl. 180—6.66)

This invention relates to mechanism for controlling the movement of a vehicle, and more particularly to mechanism which functions to control the movement of a vehicle in forward, rearward and turning directions.

The present invention represents an improvement over the Steering and Drive Mechanism for Vehicles disclosed in my copending application filed July 5, 1963, under Serial No. 293,065, now abandoned.

It is the principal object of the present invention to provide an improved steering and drive control for vehicles, by which to enhance the maneuverability of the latter without necessity for the complicated and expensive steering gear and steerable wheels.

Another important object of this invention is the provision of a steering and drive control for vehicles which is of simplified construction for economical manufacture, which is extremely rugged and thus suitable for use with vehicles requiring high output power, and yet which is operable to provide precise control of driving and steering.

The foregoing and other objects and advantages to this invention will appear from the following detailed description, taken in connection with the accompanying drawing in which.

Figure 2:
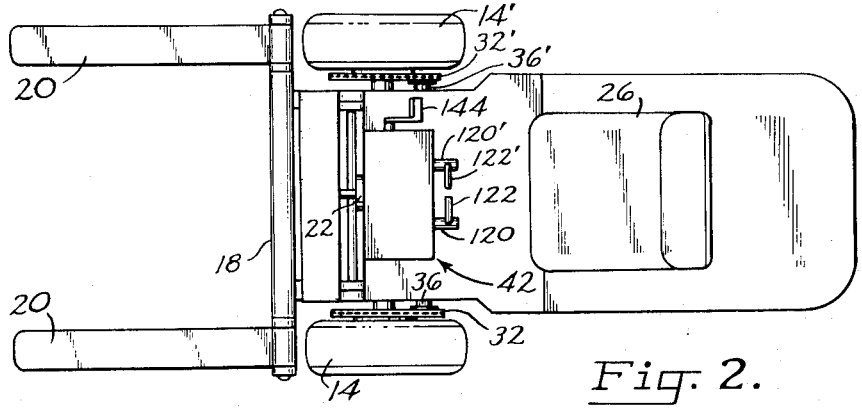
FIG. 2 is a plan view of FIG. 1.

The vehicle shown in the drawing includes an elongated frame 10 supported at its rear end by the laterally spaced caster wheels 12 and at its front end by the laterally spaced traction drive wheels 14 and 14'. The traction drive wheels are mounted on a transverse axle 16 for rotation independently of each other. This simplified mounting of the traction wheels is permitted since these wheels are not required to turn on vertical axes for steering the vehicle, as will appear hereinafter.

For purposes merely of illustration, the vehicle frame is shown to support the upstanding guide frame 18 for the vertically movable forks 20. The guide frame is supported pivotally at its lower end on the forward end of the frame and is adjustable arcuately about its pivot support by means of the extensible power unit 22, as is well known in the art.

The frame supports a drive motor 24, for example a conventional gasoline engine, adjacent the rear of the frame, and an operator's seat 26 is supported forwardly thereof.

In accordance with the present invention, mechanism is provided for controlling the driving of each of the traction wheels independently of each other. Since the control mechanism for each wheel is identical the following discussion will refer to the assembly associated with the left hand drive wheel (which is the assembly exposed to view in the right hand portion of FIG. 3), and the corresponding components of the assembly associated with the right hand drive wheel are distinguished therefrom by the prime superscript applied to the corresponding reference numerals.

Thus, there is secured to the inner side of the traction wheel 14 a sprocket 30 which is operatively connected through the chain 32 to a sprocket 34 carried on the outer end of the shaft 36. This shaft extends through aligned openings in the outer end wall 38 and intermediate wall 40 of the housing 42 supported on the vehicle frame adjacent the front thereof.

Supported freely on the shaft 36 for rotation independently of the shaft and of each other are the opposed bevel gears 44 and 46. The internal bore of the hub 48 of each gear forms a bearing support for the shaft, and the external surface of each hub is mounted for rotation in the bearings 50 supported by the end and intermediate walls of the housing.

Figure 1:
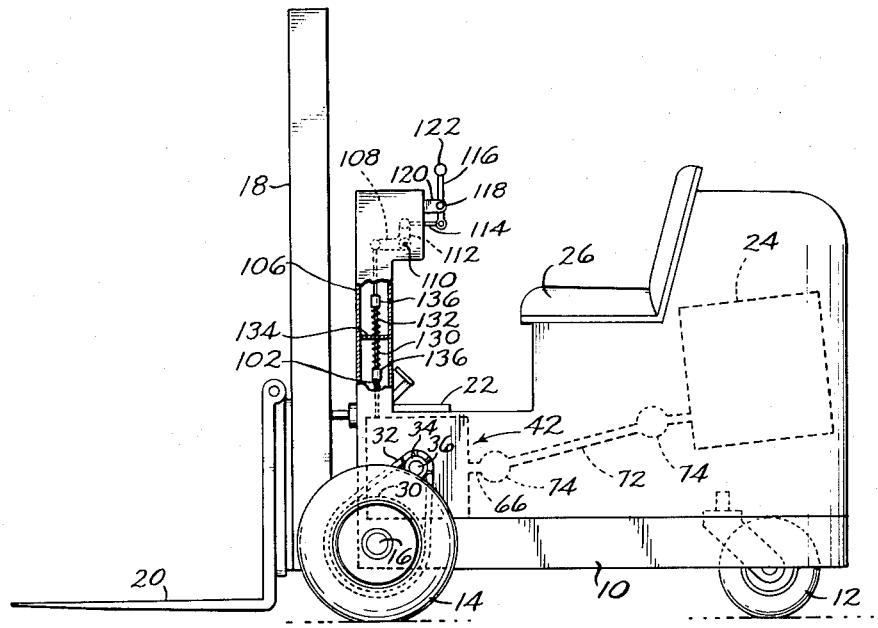
FIG. 1 is a view in side elevation of a vehicle having incorporated therewith steering and drive control mechanism embodying the features of the present invention.

The bevel gears are interconnected by a pinion 52 whose shaft 54 is mounted for rotation in a bearing 56 supported by the rear wall 58 of the housing. The rearward extension of the shaft 54 supports a sprocket 60 which is connected by chain 62 to the corresponding sprocket 60' of the control assembly for the right hand drive wheel 14'. The sprockets thus are interconnected for simultaneous operation. Intermediate the sprockets, this chain 62 engages a drive sprocket 64, the supporting drive shaft 66 of which is mounted in bearings supported by the rear wall 58 of the control housing and the rear wall 68 of the sprocket housing 70. The drive shaft 66 extends rearward for connection to the drive motor 24, as by means of the interconnecting drive shaft 72 and universal couplings 74 (FIG. 1).

Various means, other than pinion 52 and the associated connections to drive motor 24, may be employed to effect simultaneous rotation of the gears 44, 46 in opposite directions. The illustrated arrangement is preferred for its simplicity and ruggedness of construction.

Mounted on a splined section 76 of the shaft 36 adjacent the bevel gear 44 is a clutch plate 78. The clutch plate thus rotates with the shaft but is free to move longitudinally thereof to releasably engage one of its faces frictionally with the adjacent face of the bevel gear. A pressure plate 80 also is mounted on the shaft 36 for rotation independently thereof and for movement longitudinally thereof, for moving the clutch plate into and out of engagement with the bevel gear. The pressure plate is coupled to the bevel gear for rotation therewith but for movement toward and away from it, by such means as the circumferentially spaced pins 82 radiating from the plate and slidably engaging the longitudinal slots 84 in the inner face of the gear.

In similar manner, a second splined section 86 adjacent the bevel gear 46 supports the clutch plate 88 for rotation with the shaft 36 and for movement longitudinally thereof. The associated pressure plate 90 is mounted on the shaft in the same manner as plate 80.

Longitudinal movement of the opposing pressure plates 80 and 90 is effected by means of the thrust sleeve 92 which freely encircles the shaft 36 intermediate the splined sections and bears at its opposite ends against the opposing hubs of the spaced pressure plates. The sleeve is provided with an external fast thread which meshes with a corresponding thread on the internal bore of the mounting block 94 supported by the pedestal 96 extending from the front wall 98 of the housing. A lever rod 100 projects radially from the sleeve and is connected pivotally to the lower end of the link rod 102. The latter extends upwardly through an opening in the cover plate 104 of the housing 42 and through the hollow control housing 106. The upper end of the link rod is connected pivotally to one arm 108 of a bell crank lever which is supported in the housing 106 intermediate its ends by means of the pivot pin 110. The opposite arm 112 of the bell crank lever is connected pivotally to one end of a link 114, the opposite end of which is connected pivotally to the lower end of the control lever 116. This lever is mounted pivotally intermediate its ends, by means of the pivot pin 118, on the bracket 120 projecting from the control housing. The lever 116 is provided at its upper end with a laterally extending handle 122 to facilitate manipulation.

Figure 3:
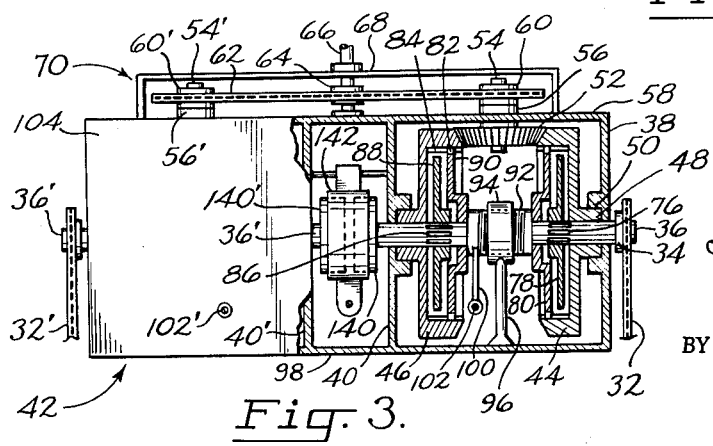
FIG. 3 is a fragmentary plan view of the steering and drive control mechanism, portions thereof being shown in section to disclose details of internal construction.

Thus, it can be seen that if the control lever 116 is rotated in the clockwise direction (FIG. 1) about its pivot 118, the link rod 102 is moved downward, effecting rotation of the sleeve 92 in the direction to move it toward the right, in FIG. 3, relative to its mounting block 94. Accordingly, the right hand pressure plate 80 will be moved toward the right, forcing its associated clutch plate 78 into positive frictional engagement with the associated right hand bevel gear 44.

On the other hand, this movement of the sleeve 92 toward the right causes it to be withdrawn from engagement with the left hand pressure plate 90. Accordingly, the latter is withdrawn from its associated clutch plate 88 which, in turn, is removed from frictional engagement with the left hand bevel gear 46.

Accordingly, with the foregoing clockwise rotation of the control lever 116 and consequent engagement of the right hand bevel gear 44 with the shaft 36, through the engaging clutch plate 78, the shaft is rotated in the direction to effect driving rotation of the associated traction wheel 14 in the direction to move the vehicle rearward.

In similar manner, if the control lever 116 is rotated in the counterclockwise direction in FIG. 1 the link rod 102 is moved upwardly and the sleeve 92 is caused to rotate in the direction to move it toward the left in FIG. 3. Thus, the left hand pressure plate 90 forces the associated clutch plate 88 into frictional driving engagement with the left hand bevel gear 46, while the right hand clutch plate 78 is removed from frictional engagement with its associated bevel gear 44. This effects driving of the shaft 36 in the direction to rotate the traction wheel 14 in the direction to drive the vehicle forward.

Means preferably is provided to maintain the control lever 116 and associated clutch plates 78 and 88 automatically in the neutral, disengaged position. In the embodiment illustrated, such means is provided by the opposed springs 130 and 132 (FIG. 1) which encircle the link rod 102 and bear at one end on opposite sides of the transverse plate 134 through which the link rod slidably extends. The opposite ends of the springs bear against collars 136 secured to the link rod. Thus, vertical movement of the link rod in either direction is opposed by the resistance of one of the springs, whereupon release of the control lever automatically returns the link rod to the neutral position illustrated.

The system of control linkages described hereinbefore may be replaced by other control means, such as reciprocative hydraulic or pneumatic piston-cylinder units, or electric solenoids, to effect the controlled movement of link rod 102 and lever 100.

With the drive motor 24 in operation the opposed bevel gears 44 and 46 are maintained in a state of continual rotation, in opposite directions, through the pinion 52. Since the bevel gears normally are free to rotate independently of the shaft 36, no disconnecting clutch need be provided at the output of the drive motor. However, such a conventional clutch may be provided, if desired.

The control assembly housing 42 between the walls 38 and 40 and the sprocket housing 70 are made liquid tight, by suitable seals not illustrated, so that they may be filled with oil to insure proper lubrication and heat dissipation.

The inner ends of the shafts 36 and 36' projecting through the intermediate walls 40, 40' mount the brake drums 140 and 140' (FIG. 3) which cooperate with an associated brake band 142 operable through conventional linkage (not shown) by a foot pedal 144 (FIG. 1) to effect braking of the vehicle. However, it will be apparent that the control levers 116, 116' also may serve to brake the movement of the vehicle in either direction, simply by moving them simultaneously to the opposite side of the neutral position, to any degree desired. Accordingly, although the simplified braking system illustrated is desirable to reduce wear on the clutch plates to a minimum, it can be eliminated if desired.

By virtue of a provision of separate driving assemblies for each of the traction wheels it will be apparent that the separate control levers 116 and 116' may be manipulated in various ways to achieve corresponding movement of the vehicle. For example, both control levers may be moved simultaneously forward or rearward from their neutral positions to effect forward or rearward movement of the vehicle along a straight line. If, for example, it is desired to make a wide turn to the left while moving forward (both control levers having been moved forwardly from the neutral position), the left hand control handle 122 is moved rearward toward the neutral position until the frictional engagement of the associated clutch plate 88 has been reduced sufficiently to decrease the forward driving of wheel 14 to the extent necessary to achieve the appropriate turn. If a sharp turn to the left is desired, the left hand control handle 122 may be moved fully rearward while the right hand control handle 122' is retained in the forward position. Thus, the left hand traction wheel 14 is rotated in the reverse direction while the right hand traction wheel 14' is driven in the forward direction. Under this condition of control the vehicle is caused to turn substantially on a point midway between the traction wheels.

From the foregoing it will be understood that the individual gear and control assemblies may be manipulated to effect driving of the traction wheels simultaneously in either forward or reverse directions, or independently in opposite directions, and that the degree of coupling between the shaft 36 and bevel gears 44, 46 may be varied by the degree of pressure applied by the pressure plates to the associated clutch plates. Extremely sharp or minutely subtle changes in speed and direction thus may be achieved.

Although the control assembly has been illustrated herein in connection with a fork lift truck, it will be apparent that the control assembly is equally adaptable for use with vehicles of various other types. For example, it is admirably suited for use with vehicles of the track laying type. Additionally, one of the pair of illustrated control assemblies may be employed to control the reversible driving of a single rotary shaft or other element comparable to one of the traction wheels illustrated.

It will be apparent to those skilled in the art that various changes may be made in the details of construction described hereinbefore without departing from the spirit of this invention and the scope of the appended claims.

Having now described my invention and the manner in which it may be used, what I claim as new and desire to secure by Letters Patent is:

1. Drive control mechanism comprising:
   (a) a rotary driven shaft,
   (b) a pair of laterally spaced gears mounted freely on the driven shaft for rotation independently of the shaft and each other,
   (c) each gear having a clutch plate bearing surface facing the other and disposed substantially normal to the axis of the driven shaft,
   (d) drive means engaging the gears for rotating the latter in opposite directions,
   (e) a pair of clutch plates one associated with each gear and each mounted on the shaft for rotation therewith and for longitudinal movement relative thereto toward and away from the clutch plate bearing surface of the associated gear,
   (f) a pair of pressure plates one associated with each clutch plate and gear, each pressure plate slidably engaging the associated gear for rotation therewith and for longitudinal movement relative thereto, and each pressure plate freely encircling the driven shaft for longitudinal movement relative thereto toward and away from the associated clutch plate, (g) control means mounted for longitudinal movement relative to the driven shaft and interposed between the pair of pressure plates and bearing against the latter at its opposite ends, and (h) actuator means engaging the control means for moving the latter to move one of the pressure plates and associated clutch plate toward its associated gear while simultaneously moving the other pressure plate and associated clutch plate away from its associated gear.

2. In a vehicle having a drive motor and a pair of laterally spaced drive wheels mounted for independent roation: steering and drive control mechanism for said drive wheels, comprising (a) a pair of axially aligned rotary driven shafts one coupled to each drive wheel, (b) a pair of laterally spaced gears mounted freely on each driven shaft for rotation independently of the shaft and each other, (c) each gear having a clutch plate bearing surface facing the bearing surface of the other gear of the pair and disposed substantially normal to the axis of the associated driven shaft, (d) a pinion engaging the gears of each pair for rotating the latter in opposite directions, (e) coupling means connecting the pinions to the drive motor, (f) a pair of clutch plates associated with each shaft and one associated with each gear, each pair of clutch plates being mounted on the associated shaft for rotation therewith and for longitudinal movement relative thereto toward and away from the clutch plate bearing surface of the associated gear, (g) a pressure plate associated with each clutch plate and gear, each pressure plate slidably engaging the associated gear for rotation therewith and for longitudinal movement relative thereto, and each pressure plate freely encircling the driven shaft for longitudinal movement relative thereto toward and away from the associated clutch plate, (h) control means associated with each shaft and mounted for longitudinal movement relative to the associated shaft and interposed between the pair of associated pressure plates and bearing against the latter at its opposite ends, and (i) actuator means engaging each control means for moving the latter to move one clutch plate of a pair toward its associated gear while simultaneously moving the other clutch plate of the pair away from its associated gear.

References Cited by the Examiner
UNITED STATES PATENTS

| | | | |
|---|---|---|---|
| 1,001,292 | 8/1911 | Meek. | |
| 1,358,997 | 11/1920 | Springer | 180—6.66 |
| 1,505,371 | 8/1924 | Butler | 180—6.66 |
| 1,620,668 | 3/1927 | Lipps | 180—6.66 X |
| 2,105,680 | 1/1938 | Weiss | 180—6.2 |
| 2,465,054 | 3/1949 | Berg | 192—24 |
| 2,684,740 | 9/1954 | Mader | 180—6.2 X |

BENJAMIN HERSH, *Primary Examiner.*

J. A. PEKAR, *Assistant Examiner.*